Figure 1:
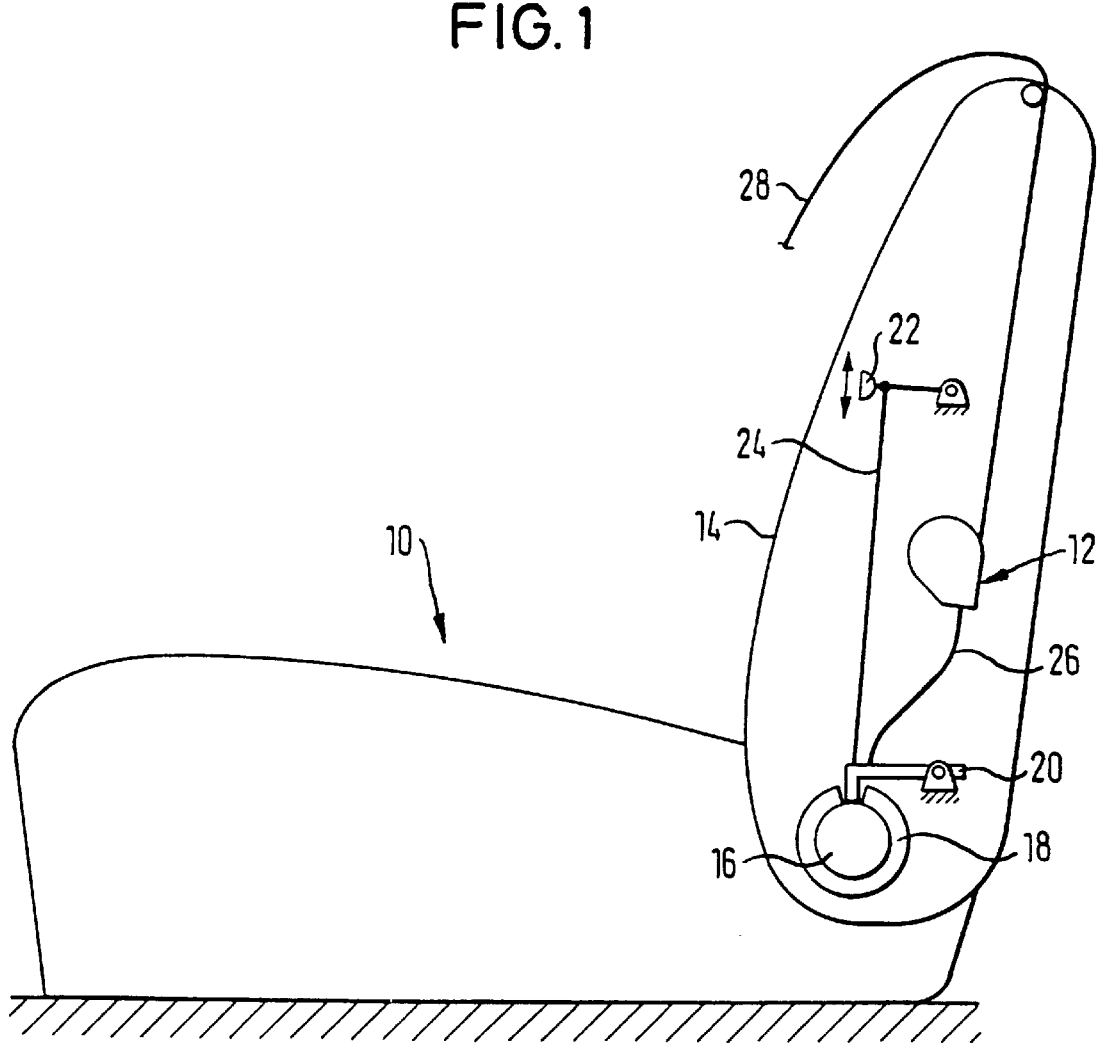

United States Patent [19]
Weller

[11] Patent Number: 6,065,811
[45] Date of Patent: *May 23, 2000

[54] BELT RETRACTOR FOR INCORPORATION IN A FOLD-DOWN TYPE BACKREST

[75] Inventor: Hermann-Karl Weller, Alfdorf, Germany

[73] Assignee: TRW Occupant Restraint Systems GmbH & Co. KG, Alfdorf, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 09/232,034

[22] Filed: Jan. 15, 1999

[30] Foreign Application Priority Data

Jan. 16, 1998 [DE] Germany ............... 298 00 709 U

[51] Int. Cl.$^7$ .................................................. B60R 22/34
[52] U.S. Cl. .................. 297/483; 297/354.12; 297/476
[58] Field of Search ..................... 297/354.12, 366–368, 297/378.12, 475, 478, 483, 476

[56] References Cited

U.S. PATENT DOCUMENTS

| | | | |
|---|---|---|---|
| 4,610,480 | 9/1986 | Yamada et al. | 297/478 |
| 5,071,194 | 12/1991 | Fohl | 297/478 |
| 5,660,444 | 8/1997 | Thomas | 297/354.12 X |
| 5,839,790 | 11/1998 | Doty | 297/478 |
| 5,882,084 | 3/1999 | Verellen et al. | 297/483 X |

*Primary Examiner*—Peter R. Brown
*Attorney, Agent, or Firm*—Tarolli, Sundheim, Covell, Tummino & Szabo L.L.P.

[57] ABSTRACT

A belt retractor is provided for incorporation in a fold-down type backrest which can be latched to a vehicle body in an upright position by a lock. The retractor has a frame and a belt, a reel rotatably mounted in the frame. A blocking mechanism is provided which blocks the belt reel non-rotatably to the frame as long as the backrest is not locked by latching action of the lock.

5 Claims, 4 Drawing Sheets

BELT RETRACTOR FOR INCORPORATION IN A FOLD-DOWN TYPE BACKREST

The present invention relates to a belt retractor for incorporation in a fold-down type backrest which can be latched to the vehicle body in the upright seating position by a lock.

When the belt retractor is not secured directly to the vehicle body but to a backrest the belt forces are introduced into the vehicle body via the backrest and its anchorage. A fold-down type backrest needs to be latched to the vehicle body so that it can take the belt forces and transfer them into the vehicle body. Latching a fold-down type backrest to the vehicle body is done by means of a lock which automatically locks in place on attaining the upright seating position of the backrest.

Since the seat belt is unable to satisfy its restraint function when the lock has failed to fully latch in place the present invention proposes to provide a blocking mechanism which blocks the belt reel non-rotatably to the frame as long as the backrest is not locked in place by latching action of the lock. When the blocking mechanism is activated no belt webbing can be withdrawn from the belt retractor. The seat belt can thus not be fastened as long as the backrest is not latched to the vehicle body, thus making it impossible for the seat belt to be fastened without it providing its restraint capability.

In a further development of the invention, the belt reel comprises ratchet teeth and the blocking mechanism an actuating finger coupled to the lock by a cable pull and having a stop which can be brought into engagement with the ratchet teeth of the belt reel. The actuating finger is coupled to the lock in such a way that, when the lock is latched in place, the stop of the actuating finger is not in engagement with the ratchet teeth of the belt reel, whereas, when the lock is not latched in place, the stop of the actuating finger causes the belt reel to be blocked. In this arrangement the movement of the actuating finger is a push or pull movement. Since the stop of the actuating finger can be directly brought into engagement with the ratchet teeth, a particularly simple configuration is achieved which can be realized by few components and thus is uncritical as regards the component tolerances. More particularly, the blocking mechanism in accordance with the invention is independent of any vehicular or belt webbing sensitive blocking mechanism optionally provided. A cable pull between the lock and actuating finger permits variable positioning of the belt retractor in the backrest; actuating this blocking mechanism also necessitating only very little exertion.

As a further development, a spring is provided with which the actuating finger is biased towards the position in which the stop is in engagement between the ratchet teeth of the belt reel and the frame or a plate fixed to the frame. As a result of this, the blocking mechanism is even activated, for example, in case the cable pull connecting the actuating finger breaks. Breakage of the cable pull then prohibits further withdrawal of belt webbing.

In a further embodiment the spring is configured as a compression spring and the cable pull is provided with a sleeve, the end part of which, provided for connection to the frame of the belt retractor, accomodates the compression spring. A stop member of the actuating finger cooperates with the compression spring. This embodiment allows a complete preassembly of the belt retractor and subsequent connection of the cable pull to the completely assembled unit.

Figure 2:
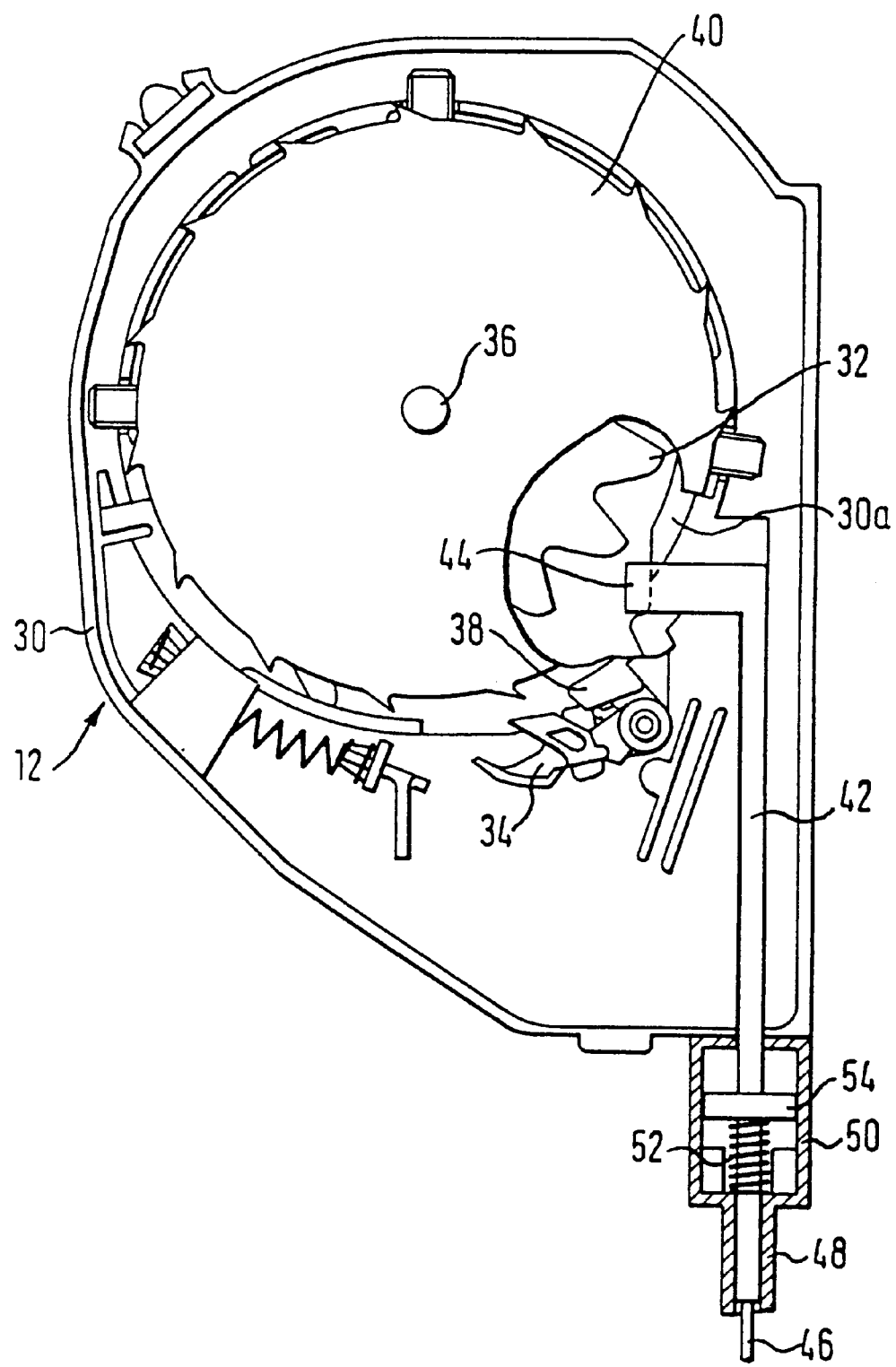
Figure 3:
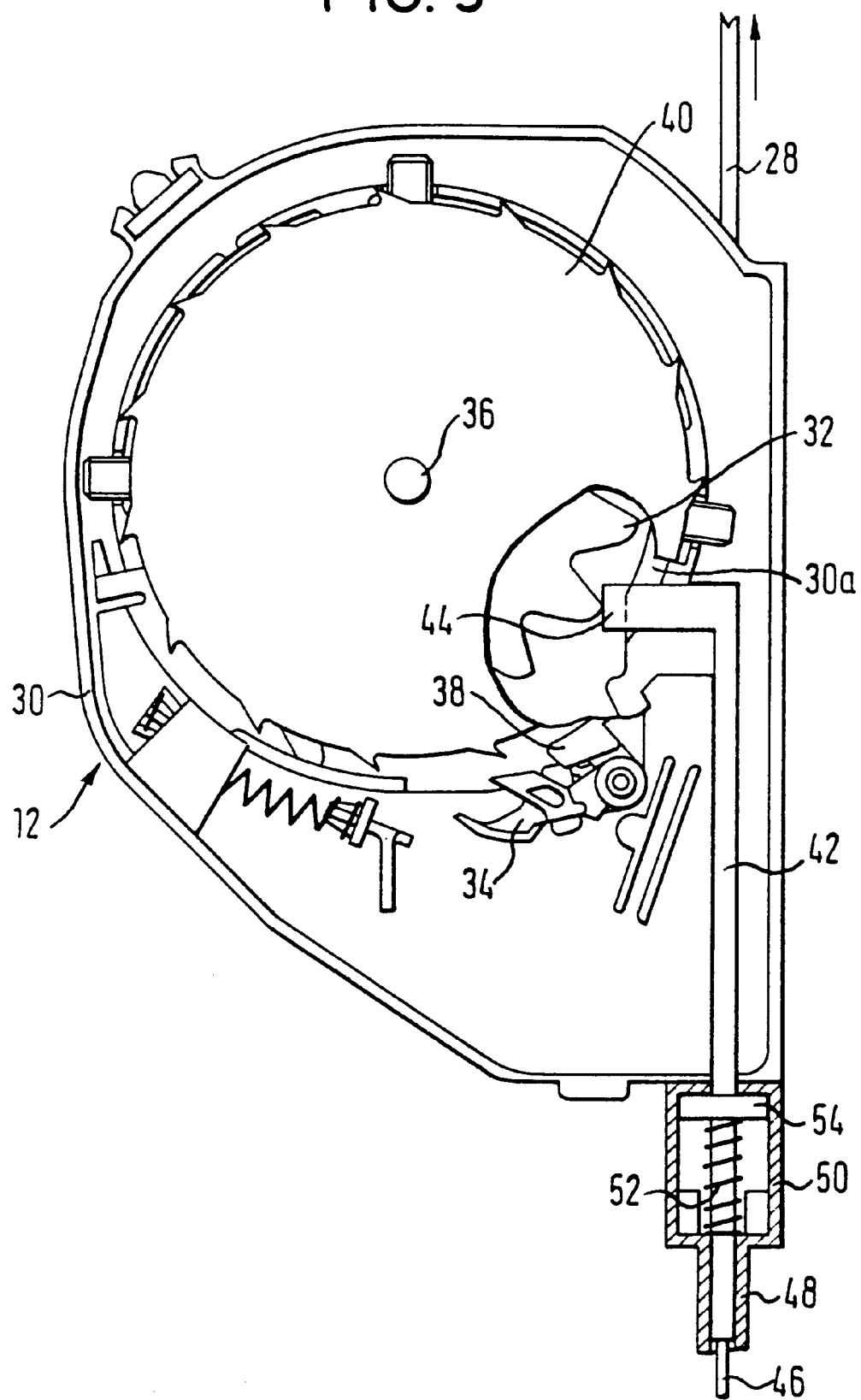
Figure 4:
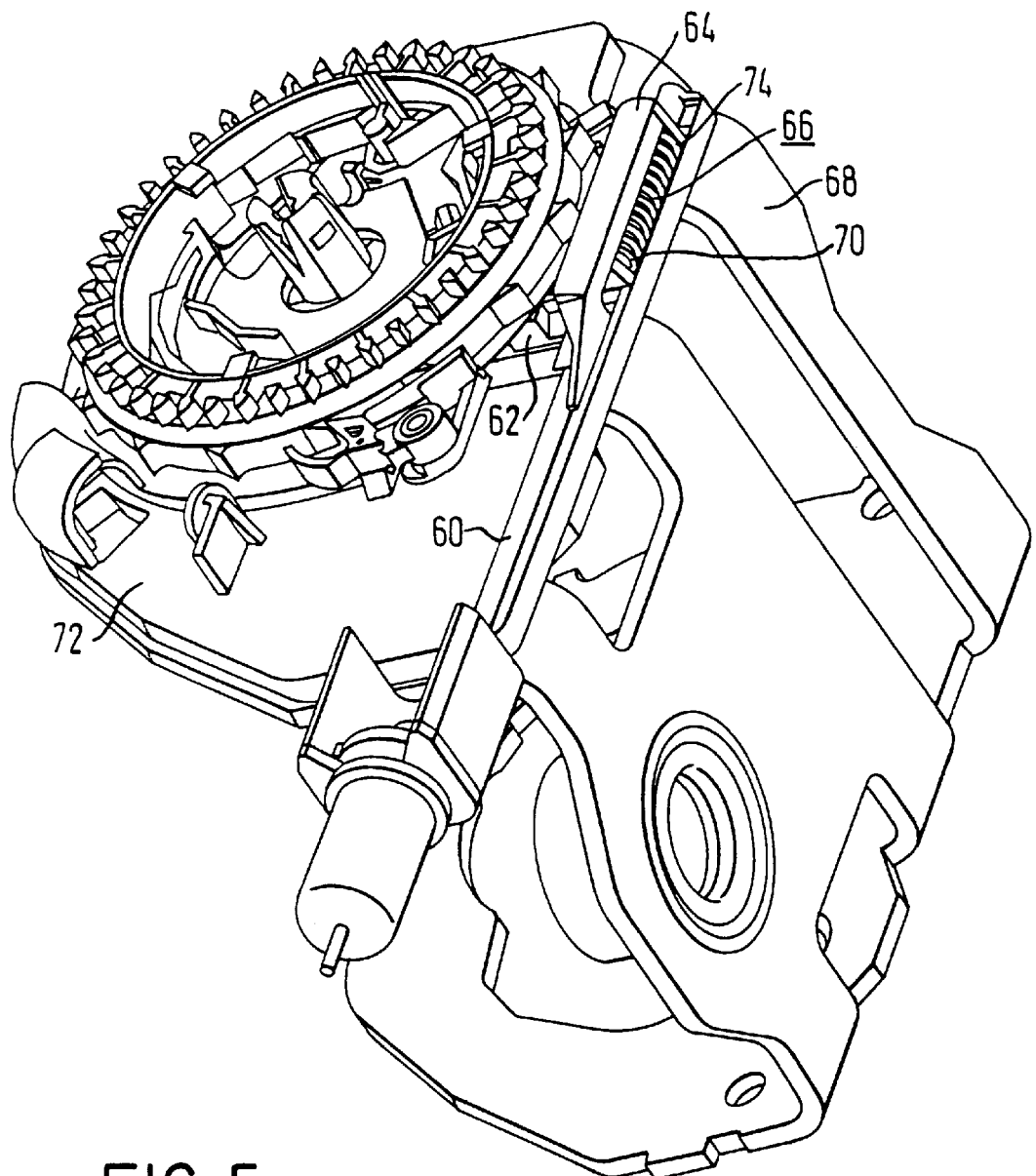
Figure 5:
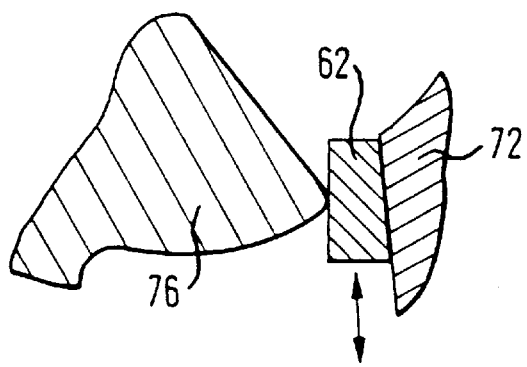

Further features and advantages of the invention are apparent from the following description of the preferred embodiment of the invention and from the drawing to which reference is made and in which:

FIG. 1 is a schematic illustration of a vehicle seat incorporating a belt retractor in accordance with the invention, FIG. 2 is a side view of a first embodiment of the belt retractor in accordance with the invention in a partially sectioned view with the backrest locked in place, FIG. 3 illustrates the belt retractor as shown in FIG. 2 with the backrest not locked in place, FIG. 4 is a perspective side view of a second embodiment of the belt retractor in accordance with the invention and FIG. 5 is a section view of a detail of the belt retractor as shown in FIG. 4.

The schematic illustration as shown in FIG. 1 shows a vehicle seat 10 incorporating a belt retractor 12 in accordance with the invention. The belt retractor 12 is arranged in the backrest 14 of the vehicle seat 10, which backrest is connected by a rotary joint 16 to the seat part thereof and thus to the vehicle body. The backrest 14 can be hinged about the rotary joint 16 and is locked in place in its upright seating position as shown in FIG. 1 by a lock. The lock is indicated schematically by a disk 18 arranged concentrically about the rotary joint 16 and fixedly connected to the seat part, and by a moving function part, i.e. a latch bolt 20. The disk 18 comprises a recess which is engaged by the latch bolt 20 swivably mounted in the backrest 14. The backrest 14 can be released and subsequently folded down by the latch bolt 20 being moved out of the recess in the disk 18. This is done by a latch release lever 22 connected with the latch bolt via a cable pull 24. The latch bolt 20 is configured as a single-armed lever, the end of which is engaged by the cable pull 24 and by a cable pull 26 which is in connection with the belt retractor 12. When the latch bolt 20 is moved out of the recess in the disk 18 by an upward movement of the latch release lever 22, the blocking mechanism of the belt retractor 12 is activated at the same time by the cable pull 26. When the latch bolt 20 is not engaging the recess in the disk 18, no belt webbing 28 can thus be withdrawn from the belt retractor 12.

The side view as shown in FIG. 2 illustrates the belt retractor 12 in detail, wherein for a better clarity a side cover hood of the belt retractor 12 has been removed and the belt retractor 12 is depicted in a partially sectioned view. The belt retractor 12 comprises a frame 30 in which a belt reel including ratchet teeth 32 is rotatably mounted. The belt retractor 12 comprises a conventional vehicular and belt-webbing sensitive blocking mechanism, depicted only in part in FIG. 2. Thus, an intermediate pawl 34 is swivably arranged on a control lever 38 mounted rotatably about a belt reel axle 36. The intermediate pawl 34 is brought into engagement in a vehicular-sensitive manner with a control disk 40 by a ball sensor (not shown) as a result of which on withdrawal of the belt webbing the control lever 38 is moved counter-clockwise as shown in FIG. 2 and causes latching pawls (likewise not shown) to engage with the ratchet teeth 32 of the belt reel.

For blocking the belt reel with the backrest not latched in place an actuating finger 42 is provided comprising at its end facing the ratchet teeth 32 a stop member 44. The actuating finger 42 is in connection with a cable pull 46 which in turn is in connection with the latch bolt shown in FIG. 1. In the condition as shown in FIG. 2 the lock of a backrest is latched and the stop member 44 of the actuating finger 42 is located outside of the region of the ratchet teeth 32. The cable pull 46 comprises a sleeve 48 the end piece 50 of which, provided for connection to the frame 30 of the belt retractor, mounts a compression spring 52 and a spring stop 54 of the actuating finger 42 cooperating with the compression spring.

The condition of the belt retractor 12 with the belt reel not latched in place is shown in FIG. 3. In this case the actuating finger 42 is located in the position in which its stop member 44 is in engagement between the ratchet teeth 32 and a section 30*a* of the frame 30. When an attempt is made to withdraw the belt webbing 28 in the direction as indicated by the arrow, one tooth of the ratchet teeth 32 comes up against the stop member 44 which in turn rests against the frame section 30*a*, as a result of which rotation of the belt reel is blocked so that no belt webbing 28 can be withdrawn from the belt reel. The compression spring 52 biases the actuating finger 42 in such a way that, should the cable pull 46 break, the stop member 44 of the actuating finger is brought into engagement between the ratchet teeth 32 and the frame section 30*a*. Thus, even when the cable pull 46 is broken, no belt webbing 28 can be withdrawn any more.

FIG. 4 shows yet a further embodiment of the belt retractor in accordance with the invention. The actuating finger 60 comprises in addition to a stop member 62 a protuberance 64. The protuberance 64 extends along a compression spring 66 arranged in elongation of the actuating finger 60 on the frame 68. One end 70 of the compression spring 66 facing the actuating finger is secured to a sensor plate 72 which is fixed relative to the frame 68. A second end 74 of the compression spring 66 engages with the protuberance 64 of the actuating finger 60. In this way, the actuating finger 60 is biased towards the position in which the stop member 62 is in engagement between the ratchet teeth and the sensor plate 72.

In the section view as shown in FIG. 6 one tooth of the ratchet teeth 76, the stop member 62 and a section of the sensor plate 72 are evident, the condition of the belt retractor shown being the blocked condition with the backrest unlatched. The directions in which the stop member 62 moves are indicated by a double arrow. The stop member 62 has a trapezoidal cross-section with a ramp permitting, on the one hand, reliable blocking of the belt reel and, on the other, release of the ratchet teeth 76 and thus of the belt reel with little expenditure of force.

I claim:

1. A belt retractor which is mounted within a fold-down type backrest which can be latched to a vehicle body in an upright position by a lock, the backrest being able to be dislatched by means of an actuator coupled to said lock, said retractor including a frame, a belt reel rotatably mounted in said frame, and a belt wound up on said belt reel, a blocking mechanism coupled to said belt reel for blocking said belt reel non-rotatably to said frame, and a connecting means coupling said lock to said blocking mechanism, said blocking mechanism being activated by said connecting means as long as said backrest is not locked in the upright position by latching action of said lock so that no belt webbing can be withdrawn from said belt reel, said belt reel having ratchet teeth, and said blocking mechanism having an actuating finger which is coupled to said lock by a cable and which has a stop member which can be brought into engagement between said belt reel ratchet teeth and said frame.

2. The belt retractor as set forth in claim 1 wherein a spring is provided for biasing said actuating finger towards a position in which said stop member is in engagement between said belt reel ratchet teeth and said frame.

3. The belt retractor as set forth in claim 2 wherein said spring is a compression spring and said cable is provided with a sleeve, said sleeve having an end piece for connection to said frame and accommodation of said compression spring, and said actuating finger having an abutment member on which an end of said compression spring bears.

4. The belt retractor as set forth in claim 2 wherein said spring is a compression spring and said actuating finger has an accommodation for said compression spring with an end wall on which one end of said spring bears, the other end of said spring bearing on an abutment member fixed to said frame.

5. The belt retractor as set forth in claim 1 wherein said stop member is slidingly supported on an abutment plate fixed with said frame, and at least one of said stop member and said abutment plate has a ramp face which causes said stop member to approach said ratchet teeth as said stop member slides on said abutment plate in a predetermined direction.

* * * * *